(12) United States Patent
Kobayashi

(10) Patent No.: US 7,125,087 B2
(45) Date of Patent: Oct. 24, 2006

(54) BRAKE FLUID PRESSURE RETAINING DEVICE

(75) Inventor: Kazuhiko Kobayashi, Kanagawa (JP)

(73) Assignee: Transtron Inc., Tokyo (JP)

( * ) Notice: Subject to any disclaimer, the term of this patent is extended or adjusted under 35 U.S.C. 154(b) by 0 days.

(21) Appl. No.: 10/893,892

(22) Filed: Jul. 20, 2004

(65) Prior Publication Data

US 2005/0029865 A1 Feb. 10, 2005

(30) Foreign Application Priority Data

Jul. 23, 2003 (JP) ............................. 2003-200575

(51) Int. Cl.
*B60T 8/32* (2006.01)
(52) U.S. Cl. .................... 303/192; 303/119.2
(58) Field of Classification Search ............. 303/119.2, 303/191, 192, 89, 199
See application file for complete search history.

(56) References Cited

U.S. PATENT DOCUMENTS

| | | | |
|---|---|---|---|
| 4,804,074 A * | 2/1989 | Kori ............................. | 477/74 |
| 6,336,689 B1 * | 1/2002 | Eguchi et al. ............... | 303/191 |
| 6,346,064 B1 * | 2/2002 | Hada et al. .................. | 477/171 |
| 6,908,161 B1 * | 6/2005 | Inagaki et al. ........... | 303/119.2 |
| 2003/0025390 A1 * | 2/2003 | Inagaki et al. .............. | 303/199 |
| 2005/0001481 A1 * | 1/2005 | Kley et al. .................. | 303/191 |

FOREIGN PATENT DOCUMENTS

| | | |
|---|---|---|
| DE | 199 41 482 A1 | 4/2000 |
| DE | 199 50 034 A1 | 4/2001 |
| EP | 1 424 253 A | 6/2004 |
| JP | 60-128051 A | 7/1985 |
| JP | 60-128052 A | 7/1985 |
| JP | 61-132151 U | 8/1986 |
| JP | 61-200054 A | 9/1986 |
| JP | 62-43067 U | 3/1987 |
| JP | 62-166123 A | 7/1987 |
| JP | 2-3568 A | 1/1990 |

(Continued)

OTHER PUBLICATIONS

JPB No. 3-8981, published Feb. 7, 1999, corresponds to JPA No. 60-128051, published Jul. 8, 1985 with Abstract.

(Continued)

*Primary Examiner*—Thomas J. Williams
(74) *Attorney, Agent, or Firm*—Sughrue Mion, PLLC

(57) ABSTRACT

A brake fluid pressure retaining unit is provided which allows a relief pressure to be variable only by use of a low-cost electromagnetic valve without using an expensive relief valve and orifice. The brake fluid pressure retaining unit includes an electromagnetic valve which is provided midway in a brake fluid channel connecting a master cylinder and a wheel cylinder and is capable of freely opening/closing the brake fluid channel by passing current though a solenoid coil; and an electromagnetic valve control section which detects a release signal indicative of releasing brake operation detected by a brake operation detecting section and passes current through the solenoid coil while referring to current values corresponding to a target maintaining fluid pressure to maintain a predetermined braking force. The electromagnetic valve control section determines in advance a predetermined opening-side current value required to switch the electromagnetic valve from a closed state to an open state and a predetermined closing-side current value required to switch the electromagnetic valve from an open state to a closed state, for each target maintaining fluid pressure, and performs control so that the value of the current to be passed through the solenoid coil is in a range between the predetermined opening-side current value and predetermined closing-side current value.

9 Claims, 14 Drawing Sheets

FOREIGN PATENT DOCUMENTS

| | | |
|---|---|---|
| JP | 3-29265 Y2 | 6/1991 |
| JP | 4-110240 A | 4/1992 |
| JP | 5-254405 A | 10/1993 |
| JP | 6-6144 U | 1/1994 |
| JP | 6-74542 U | 10/1994 |
| JP | 7-40332 U | 7/1995 |
| JP | 8-282456 A | 10/1996 |
| JP | 9-188233 A | 7/1997 |
| JP | 9-202159 A | 8/1997 |
| JP | 10-44949 A | 2/1998 |
| JP | 10-329671 A | 12/1998 |
| JP | 11-310119 A | 11/1999 |
| JP | 2000-177549 A | 6/2000 |
| JP | 2000-190828 A | 7/2000 |
| JP | 2000-264182 A | 9/2000 |
| JP | 2000-272485 A | 10/2000 |
| JP | 2000-313253 A | 11/2000 |
| JP | 2000-313320 A | 11/2000 |
| JP | 2000-313321 A | 11/2000 |
| JP | 2000-351340 A | 12/2000 |
| JP | 2000-351360 A | 12/2000 |
| JP | 2000-351361 A | 12/2000 |
| JP | 2001-47987 A | 2/2001 |
| JP | 2001-47988 A | 2/2001 |
| JP | 2001-163197 A | 6/2001 |
| JP | 2001-354126 A | 12/2001 |
| JP | 2002-67901 A | 3/2002 |
| JP | 2002-87231 A | 3/2002 |
| JP | 2002-528313 A | 9/2002 |
| JP | 2003-2087 A | 1/2003 |
| WO | WO 00/21812 A1 | 4/2000 |
| WO | WO 02/090159 A1 | 11/2002 |
| WO | WO 2090159 A1 * | 11/2002 |

OTHER PUBLICATIONS

JPB No. 3-42225, published Jun. 26, 1991, corresponds to JPA No. 60-128052, published Jul. 8, 1985 with Abstract.

* cited by examiner

THRUST CHARACTERISTIC DIAGRAM OF
UNINCLINED SURFACE GAP CONFIGURATION

THRUST CHARACTERISTIC DIAGRAM OF
INCLINED SURFACE GAP CONFIGURATION

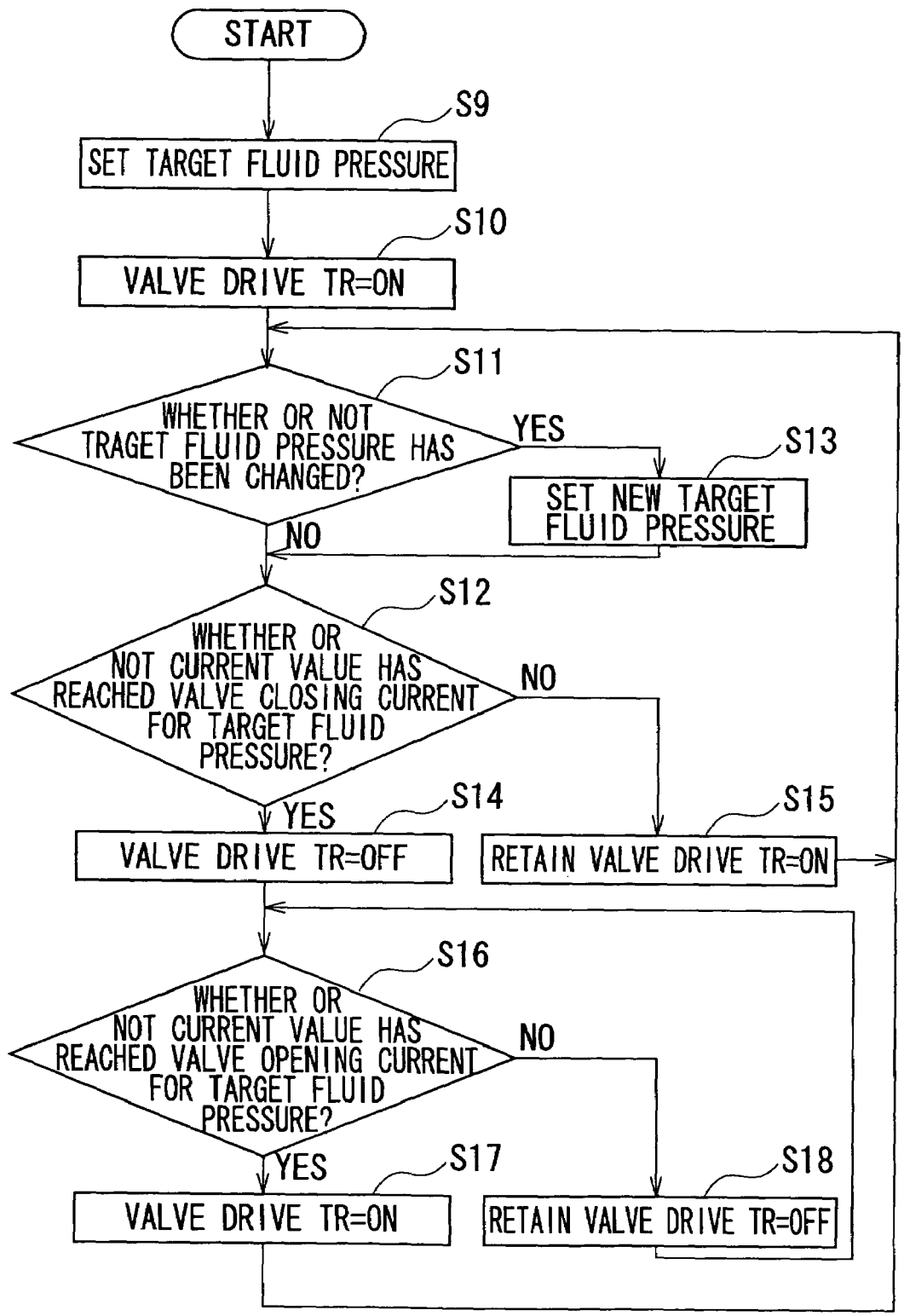

BRAKE FLUID PRESSURE RETAINING DEVICE

This application claims priority from Japanese Patent Application No. 2003-200575 filed on Jul. 23, 2003, the disclosure of which is hereby incorporated by reference herein.

BACKGROUND OF THE INVENTION

1. Field of the Invention

The present invention relates to a brake fluid pressure retaining unit that applies brake fluid pressure to the inside of a wheel cylinder even after the brake is released and thus maintains a predetermined brake fluid pressure so as to prevent a vehicle from moving backward (creeping down), for example, even on a steep hill.

2. Description of the Related Art

For instance, to start again a vehicle in a state of being temporarily stopped on an uphill slope such as an uphill road, a driver of a vehicle with a manual transmission (manual transmission vehicle) needs to perform troublesome operation, specifically, to cause partial clutch engagement while maneuvering a parking brake and depress an accelerator pedal to start the vehicle.

On the other hand, a vehicle with an automatic transmission (automatic transmission vehicle) is capable of providing creep force. However, for demands for improvement in fuel economy, environmental friendliness, and the like, it is required for vehicles to stop in an idle stop state or to reduce the engine idle speed. For this reason, even an automatic transmission vehicle moves backward when a driver changes pedals to depress from a brake pedal to an accelerator pedal on an uphill road, because creep force is lost or reduced.

Therefore, to prevent a vehicle from moving backward when starting the vehicle on a hill, a brake fluid pressure retaining unit has been proposed which continues to apply brake fluid pressure to the inside of a wheel cylinder even after a driver has released the depression of a brake pedal (for example, see Patent Document 1).

In this brake fluid pressure retaining unit, a brake fluid pressure circuit connecting a wheel cylinder and a master cylinder for generating brake fluid pressure according to depression force on a brake pedal caused by a driver, is provided with an electromagnetic valve capable of freely opening/closing the brake fluid pressure circuit, a relief valve for abruptly reducing the brake fluid pressure to a level where creep force is generated, and an orifice for making a decreasing rate for the brake fluid pressure inside the wheel cylinder smaller than a decreasing rate for the depression force on a brake pedal caused by a driver.

In this brake fluid pressure retaining unit, an extremely high pressure is applied to the wheel cylinder because a driver depresses a brake pedal with greater force than needed to obtain braking force. However, by use of the relief valve, the high brake fluid pressure can be abruptly reduce to a pressure that produces creep force, and further, the brake fluid pressure is gradually reduced by use of the orifice. Accordingly, when starting the vehicle on a hill, brake fluid pressure is continuously applied to the inside of the wheel cylinder after the driver releases the depression of the brake pedal until the driver starts the vehicle, thus preventing the vehicle from moving backward when it is started.

(Patent Document 1)

Japanese Patent Laid-Open No. 2000-190828 (pp 7–8, FIGS. 1 and 3)

However, in the above-described brake fluid pressure retaining unit, since a relief pressure obtained by use of the relief valve is constant, if, on a steep hill, braking force attributable to the relief pressure (brake fluid pressure) becomes less than creeping-down force due to a hill (force due to the weight of the vehicle), it will results that the vehicle moves backward. Moreover, in this brake fluid pressure retaining unit, the relief valve and the orifice are needed in addition to the electromagnetic valve. Further, pressure reduction characteristics at the time of slow release (i.e., when fluid pressure is slowly reduced) depend on the orifice (throttle) and are constant. Furthermore, the orifice is very difficult to manage during a manufacturing process and also expensive.

In this brake fluid pressure retaining unit in particular, since a spring provided in the relief valve produces a constant spring force and the diameter of the orifice is constant, only a constant relief pressure can be produced even when the gradient of a hill changes. Therefore, a need to quickly reduce the fluid pressure depending on the angle of inclination cannot be met. For instance, on a downhill slope, a driver wants to quickly reduce the brake fluid pressure but cannot do so actually, and as a result, drag occurs.

Moreover, it is also conceivable that the relief pressure is variably controlled by use of a solenoid valve. However, according to a conventional and general solenoid control method, the voltage value is duty cycle controlled periodically, and accordingly, the following problems arise. As shown in FIG. 9, when the voltage value is duty cycle controlled and the current value is controlled to be constant, it is difficult to maintain a constant oil pressure. That is, when the current value is intended to be constant, as can be seen from FIG. 9, the current value may become both a value that causes an electromagnetic valve to open and a value that causes the electromagnetic valve to close, and accordingly, the solenoid valve will be either in an open state or closed state depending on the state of the electromagnetic valve.

That is to say, when the current value is made constant based on the state of the electromagnetic valve before controlled, the maintaining oil pressure is greatly affected by this fact, and a balance is caught at a low value of maintaining oil pressure that brings the electromagnetic valve in a closed state. In the case of the balance at this value of maintaining oil pressure, when the electromagnetic valve is desired to be switched from a closed state to an open state, and again to a closed state (i.e., when the maintaining oil pressure is desired to be slightly lowered), the maintaining oil pressure is in some cases excessively reduced more than needed to make the electromagnetic, which has been once brought in an open state, return to a closed state. Such a problem is caused by the fact that the current value is controlled by performing periodical duty cycle control of the voltage value, and accordingly, instantaneous response ability of the current value is affected by the self-heating of the electromagnetic valve and the like.

SUMMARY OF THE INVENTION

In this connection, the present invention has been achieved to solve the above-stated problem and an object thereof is to provide a brake fluid pressure retaining unit which allows the relief pressure to be variable only by use of a low-cost electromagnetic valve without using an expensive relief valve and orifice, further allows the slow release rate to be variable, and thus can maintain a predetermined brake fluid pressure with a simple structure.

A brake fluid pressure retaining unit according to the present invention includes brake operation detecting means, an electromagnetic valve, and control means. The brake operation detecting means detects whether or not a brake of a vehicle providing creep force is operated. The electromagnetic valve has a solenoid coil and is disposed midway in a brake fluid channel connecting a master cylinder and a wheel cylinder. The electromagnetic valve opens/closes the brake fluid channel in response to current being passed through the solenoid coil. The control means detects a release signal indicative of releasing brake operation detected by the brake operation detecting means and passes current through the solenoid coil while referring to predetermined current values. The predetermined current values correspond to a target maintaining fluid pressure that maintains a predetermined braking force.

In the above configuration, upon detection of the release signal indicative of releasing brake operation, the control means passes current through the solenoid coil while referring to the predetermined current values corresponding to the target maintaining fluid pressure that maintains the predetermined braking force. As a result, the electromagnetic valve operates like a relief valve, so to speak. Accordingly, when depression of a brake pedal is released (when brake operation is released), the brake fluid pressure can be reduced to a predetermined brake fluid pressure, and the predetermined brake fluid pressure and a brake fluid pressure within the wheel cylinder can balance each other.

The control means may pass current through the solenoid coil so that the value of the current is in a range between a predetermined opening-side current value and a predetermined closing-side current value which are determined in advance for each target maintaining fluid pressure. The predetermined opening-side current value is a current value required to switch the electromagnetic valve from a closed state to an open state. The predetermined closing-side current value is a current value required to switch the electromagnetic valve to be from an open state to a closed state.

In the above configuration, since the value of current to be passed through the solenoid coil is controlled to be in a range between the predetermined opening-side current value and the predetermined closing-side current value, the relief pressure can be freely changed.

BRIEF DESCRIPTION OF THE DRAWINGS

The above and other features will be better understood from the exemplary embodiment described below, taken together with the drawing, of which

FIG. 17 is a flow chart illustrating how brake fluid pressure retaining control is performed by the brake fluid pressure retaining unit of the embodiment.

DESCRIPTION OF THE PREFERRED EMBODIMENT

A preferred embodiment to which the present invention is applied will be explained in detail below with reference to the accompanying drawings. The embodiment is an example where a brake fluid pressure retaining unit according to the present invention is incorporated in a brake fluid pressure circuit of a hydraulic brake device.

(Schematic Configuration of Hydraulic Brake Device)

Figure 1:
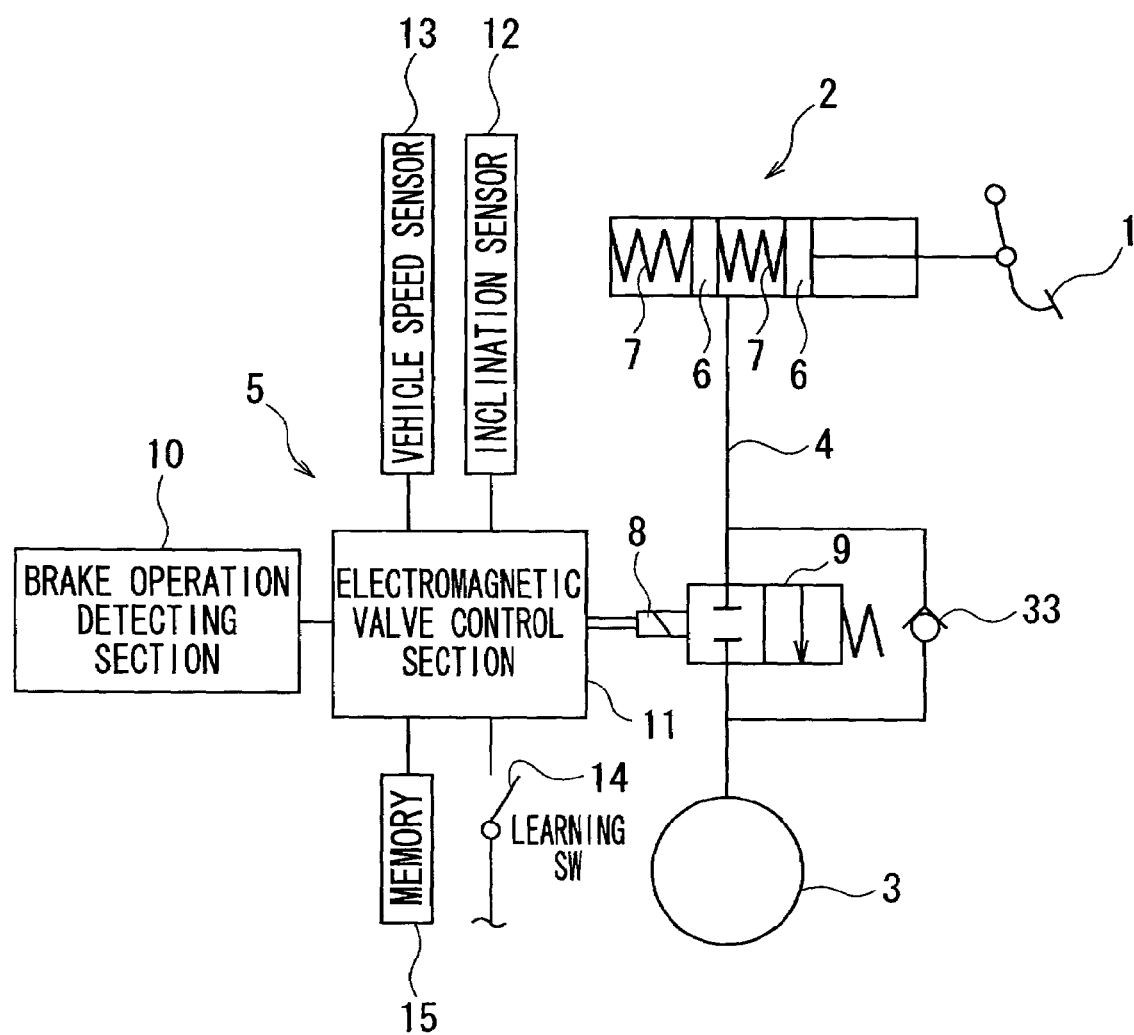
FIG. 1 is a circuit diagram illustrating an example in which a brake fluid pressure retaining unit of an embodiment is incorporated in a brake fluid pressure circuit of a hydraulic brake device.

As shown in FIG. 1, the hydraulic brake device includes: a master cylinder 2 for generating braking force in response to the pedal effort on a brake pedal 1; a wheel cylinder 3 supplied with brake fluid in the master cylinder 2; a brake fluid channel 4 connecting the master cylinder 2 and wheel cylinder 3; and a brake fluid pressure retaining unit 5 provided midway in the brake fluid channel 4.

The master cylinder 2 allows a piston 6 to be movably inserted in the main body thereof and to move forward when the brake pedal 1 is depressed so that the brake fluid pressure inside the master cylinder 2 is increased. Further, when the depression of the brake pedal 1 is released, the piston 6 is pushed back to its original position by a backing spring 7 provided in the main body of the master cylinder 2, thus reducing the brake fluid pressure inside the master cylinder 2.

The wheel cylinder 3 performs a function of converting the brake fluid pressure increased by the master cylinder 2 in a way of depressing the brake pedal 1 into mechanical braking force for braking the rotation of the wheels. A piston (not shown) is inserted in the main body of the wheel cylinder 3. The piston is pushed by the brake fluid pressure to actuate a brake pad in the case of a disc brake, or a brake shoe in the case of a drum brake, thus creating braking force for controlling the wheels.

The brake fluid channel 4 connects the master cylinder 2 and the wheel cylinder 3, and serves as a channel for transmitting a brake fluid pressure generated in the master cylinder 2 to the wheel cylinder 3 by allowing the brake fluid to move from the master cylinder 2 to the wheel cylinder 3. Further, the brake fluid channel 4 serves as a channel for returning the brake fluid from the wheel cylinder 3 to the master cylinder 2 when the brake fluid pressure inside the wheel cylinder 3 is higher than that inside the master cylinder 2.

It should be noted that, in the brake fluid channel 4, a check valve 33 is provided to supply the brake fluid from the master cylinder 2 to the wheel cylinder 3 when the brake pedal 1 is further depressed.

(Configuration of Brake Fluid Pressure Retaining Unit)

As shown in FIG. 1, the brake fluid pressure retaining unit 5 is provided midway in the brake fluid channel 4 connecting the master cylinder 2 and the wheel cylinder 3. The brake fluid pressure retaining unit 5 includes: an electromagnetic valve 9 capable of freely opening/closing the brake fluid channel 4 by the passage of current though a solenoid coil 8; a brake operation detecting section 10 operable as brake operation detecting means for detecting whether or not the brake pedal 1 is depressed; and an electromagnetic valve control section 11 operable as control means for detecting a release signal indicative of releasing brake operation detected by the brake operation detecting section 10, and then passing current through the solenoid coil 8 while referring to current values corresponding to a target maintaining fluid pressure that maintains a predetermined braking force. Further, in addition to the above components, the brake fluid pressure retaining unit 5 includes means for detecting various vehicle-related information about, for example, whether or not the vehicle is in an idle stop state.

Moreover, the brake fluid pressure retaining unit 5 is configured by including: an inclination sensor 12 operable as inclination detecting means for detecting the inclining state of a vehicle; a vehicle speed sensor 13 operable as vehicle speed detecting means for detecting the speed of a vehicle; a learning switch (learning SW) 14 used to determine a predetermined opening-side current value required to switch the electromagnetic valve 9 from a closed state to an open state and a predetermined closing-side current value required to switch the electromagnetic valve 9 from an open state to a closed state, for each target maintaining fluid pressure, based on detected data detected by the inclination sensor 12 and vehicle speed sensor 13; and a memory 15 operable as storage means for storing the predetermined opening- and closing-side current values for each target maintaining fluid pressure.

Figure 2:
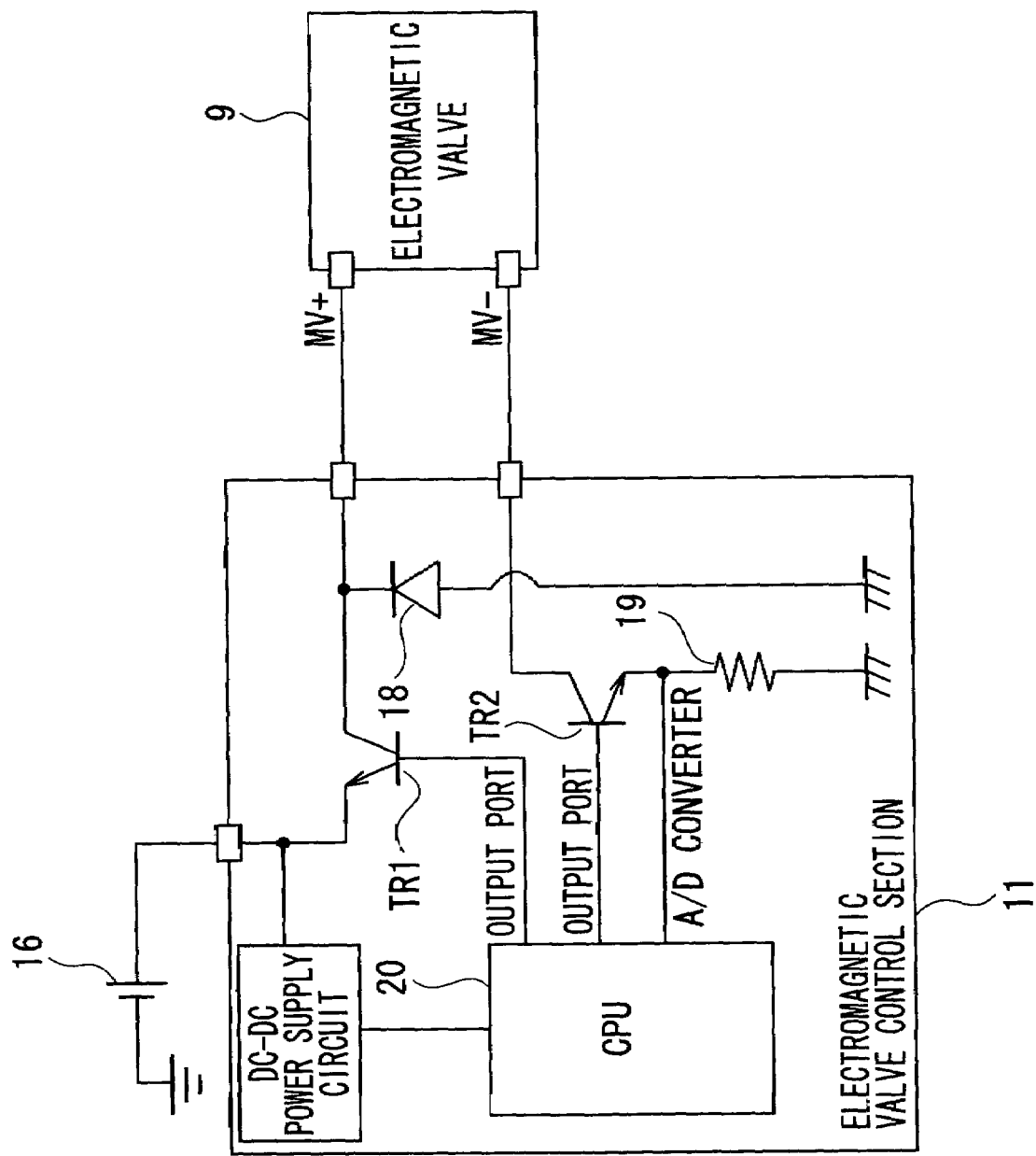
FIG. 2 is a circuit configuration diagram of an electromagnetic valve control section of the brake fluid pressure retaining unit.

As shown in FIG. 2, the electromagnetic valve control section 11 includes: a power supply 16 for supplying current to be passed through the electromagnetic valve 9; transistors TR1, TR2 and a diode 18 for passing a predetermined current through the solenoid coil 8; a shunt resistor 19 for detecting the value of current to be passed through the solenoid coil 8; and a CPU 20 controlling these components.

The CPU 20 controls current to be supplied to the electromagnetic valve 9 by controlling the transistor TR1 and the like while detecting the value of the current by using the shunt resistor 19, so that the value of the current becomes equal to a current value corresponding to a target maintaining fluid pressure stored in the memory 15. Further, the CPU 20, as will be explained later, performs control so that current is passed through the solenoid coil 8, with a current value within a range between a predetermined opening-side current value (required to switch the electromagnetic valve 9 from a closed state to an open state) and a predetermined closing-side current value (required to switch the electromagnetic valve 9 from an open state to a closed state), both determined for each target maintaining fluid pressure. Moreover, the transistor TR2 retains an electrical conduction state while the power supply is ON and breaks electrical conduction (non-conduction) during failure.

Figure 3:
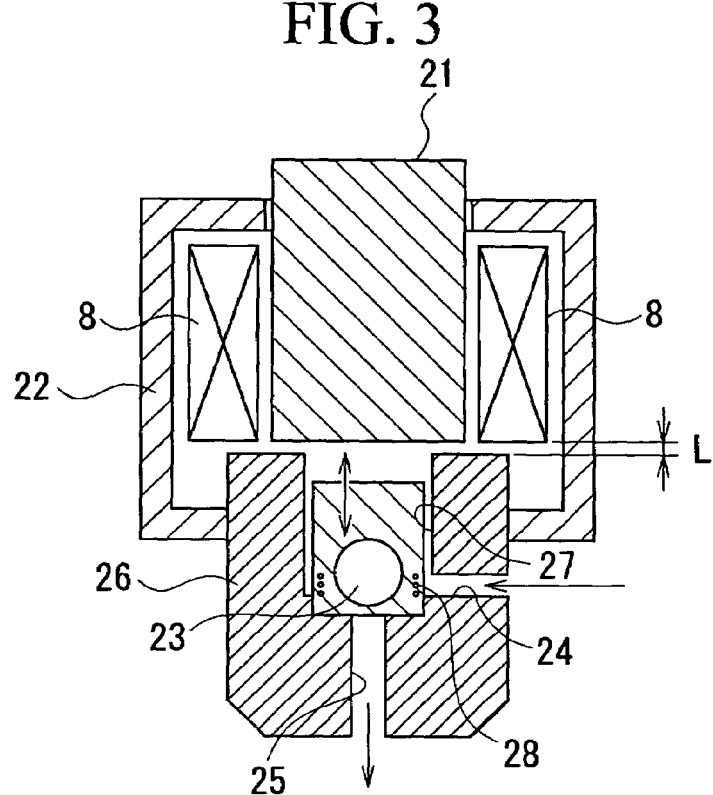
FIG. 3 is a cross sectional view of an electromagnetic valve controlled by the electromagnetic valve control section in an open state.
Figure 4:
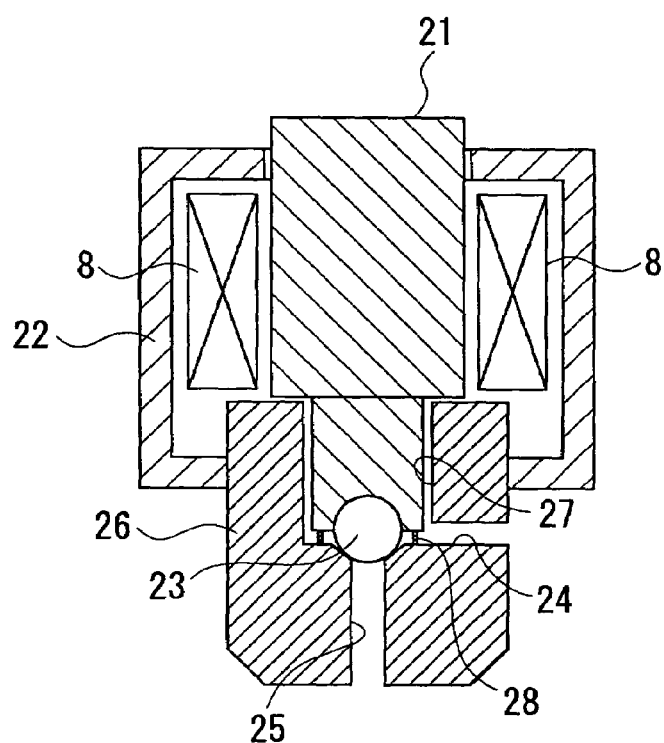
FIG. 4 is a cross sectional view of the electromagnetic valve controlled by the electromagnetic valve control section in a closed state.

As shown in FIGS. 3 and 4, the electromagnetic valve 9 includes: the solenoid coil 8; a movable member (plunger) 21 moving upward and downward in response to on/off switching of current to be passed through the solenoid coil 8; a yoke 22 housing the solenoid coil 8 and movable member 21 and forming a magnetic field; and a block member 23 provided as a valve member on a tip end of the movable member 21 projecting outward from the yoke 22. The tip end of the movable member 21 is inserted into a hole 27 formed in a channel coupling member 26 having a first channel 24 connected to the master cylinder 2 and a second channel 25 connected to the wheel cylinder 3, and the second channel 25 is blocked by the block member 23, thereby allowing the brake fluid channel 4 to be freely opened and closed.

Operation of the electromagnetic valve 9 will be explained. First, in the case of a non-conduction state in which current is not passed through the solenoid coil 8 (FIG. 3), the movable member 21 is energized toward the yoke 22 side (in the upward direction in the drawing) by a spring 28 provided between the tip end of the movable member 21 and the upper surface of the channel coupling member 26 defining the bottom of the first channel 24, thereby allowing the first and second channels 24 and 25 to communicate with each other. Hereinafter, this communicating state will be referred to as an electromagnetic valve open state. The electromagnetic valve open state brings the brake fluid channel 4 connecting the master cylinder 2 and wheel cylinder 3 into an open state, and thus the brake fluid can flow from the master cylinder 2 to the wheel cylinder 3 or vice versa.

On the other hand, when current is passed through the solenoid coil 8 in the electromagnetic valve open state (FIG. 4), the movable member 21 and channel coupling member 26, both made of a magnetic material such as ferrite, forms a magnetic circuit, and the movable member 21 is thereby pushed down while resisting the energizing force of the spring 28, bringing the second channel 25 into a state of being blocked by the block member 23. Hereinafter, this state will be referred to as an electromagnetic valve closed state. In the electromagnetic valve closed state, it is possible that the brake fluid pressure increased by the master cylinder 2 is maintained within the wheel cylinder 3.

Figure 6:
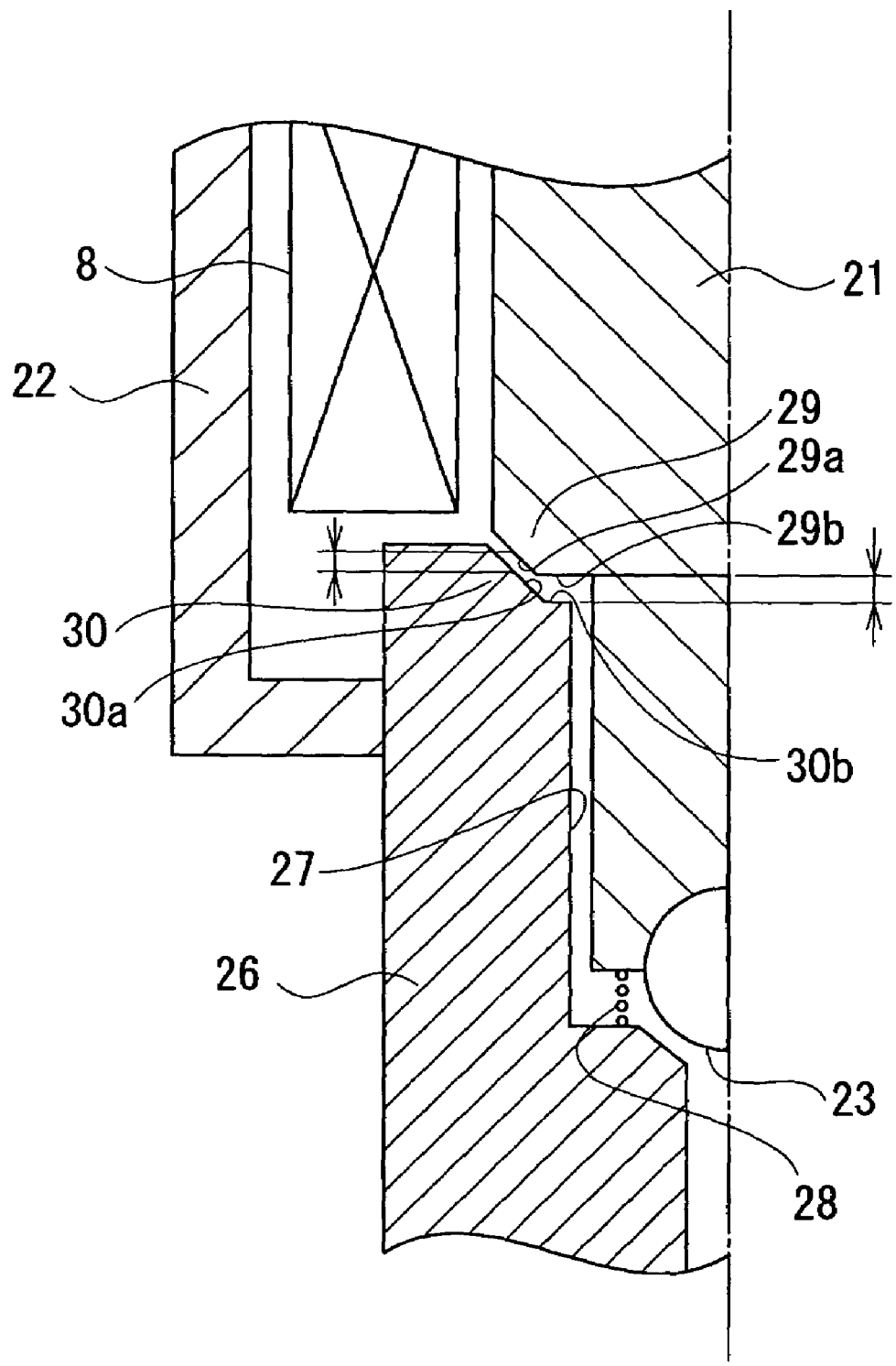
FIG. 6 is an enlarged cross sectional view of primary part of the electromagnetic valve having inclination surfaces respectively formed in a gap portion between a movable member and a channel coupling member.

It should be noted that, as shown in FIG. 6, the electromagnetic valve 9 of the embodiment is prepared such that opposed surfaces of the channel coupling member 26 and movable member 21 in a gap portion therebetween are inclined parallel to each other in order to reduce a difference between thrusts in the electromagnetic valve open state and in the electromagnetic valve closed state and thereby to improve controllability (this will be described later).

Further, from a fail-safe point of view, the electromagnetic valve 9 of the embodiment is configured to be normally open (i.e., the second channel 25 is open in the non-conduction state) so as not to allow the brake to remain effective even when a brake system fails and normal brake operation cannot be performed.

Figure 5:
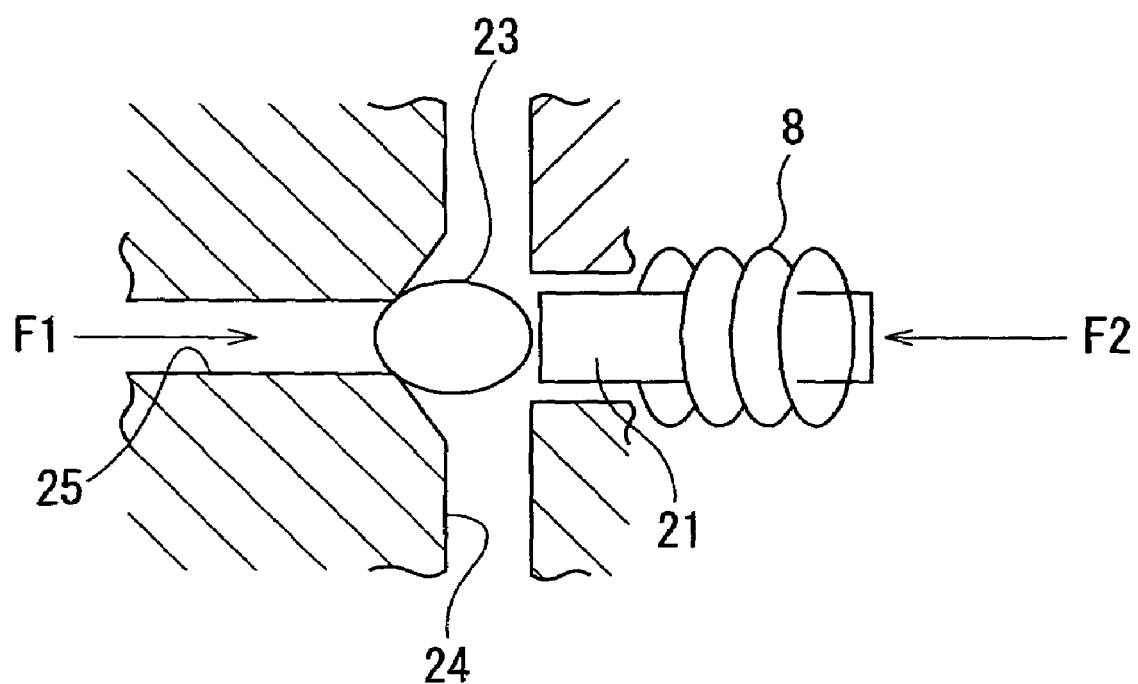
FIG. 5 is a schematic diagram illustrating the balance of forces acting on the electromagnetic valve.

Next, a method of controlling the electromagnetic valve 9 will be explained below. First, as shown in FIG. 5, the operation principle of the brake fluid pressure retaining unit as described above can be realized by controlling the balance between force F1 being caused by the brake fluid pressure and acting on the block member 23, and force F2 being generated in response to the attraction of the solenoid coil 8 and acting on the movable member 21.

That is, the force F1 acting on the block member 23 is determined by the following equation (1).

$$F1 = P \times S \qquad \text{Equation (1)}$$

P: brake fluid pressure inside wheel cylinder
S: area of a portion, blocking second channel, of block member On the other hand, the force F2 acting on the movable member 21 is determined by the following equation (2).

$$F2 = 1/2 \times (NI)^2 \times dP/dx \qquad \text{Equation (2)}$$

If the equation (2) is made to represent an ideal state for a magnetic field, the following equation (2)' results.

$$F2 = (NI)^2 \times \mu \times A/(2\pi L^2) \qquad \text{Equation (2)'}$$

N: the number of windings of solenoid coil
I: the value of current to be passed through solenoid coil
μ: magnetic permeability
A: cross sectional area of yoke
dP: permeance change
dx: stroke (gap) change In order that the forces F1 and F2 balance each other, the equation F1=F2 has to be satisfied. That is, the following equation (3) needs to be satisfied.

$$F1 = P \times S = F2 = (NI)^2 \times \mu \times A/(2\pi L^2) \qquad \text{Equation (3)}$$

The equation (3) can be expressed by $P \propto I^2$. Accordingly, only by controlling the value of current to be passed through the solenoid coil 8, the brake fluid pressure inside the wheel cylinder 3 can be freely controlled (adjusted). That is, when a driver, on a hill, starts again a vehicle in a state of being temporarily stopped by the driver strongly depressing a brake pedal, it is possible, when the driver changes the pedals to depress from the brake pedal to an accelerator pedal, that the brake fluid pressure inside the wheel cylinder 3 is reduced to a degree that does not cause the vehicle to creep down and that the reduced pressure is maintained.

It should be noted that the electromagnetic valve 9 of the embodiment employs an inclined surface gap structure or the like for the following reasons.

Figure 7A:
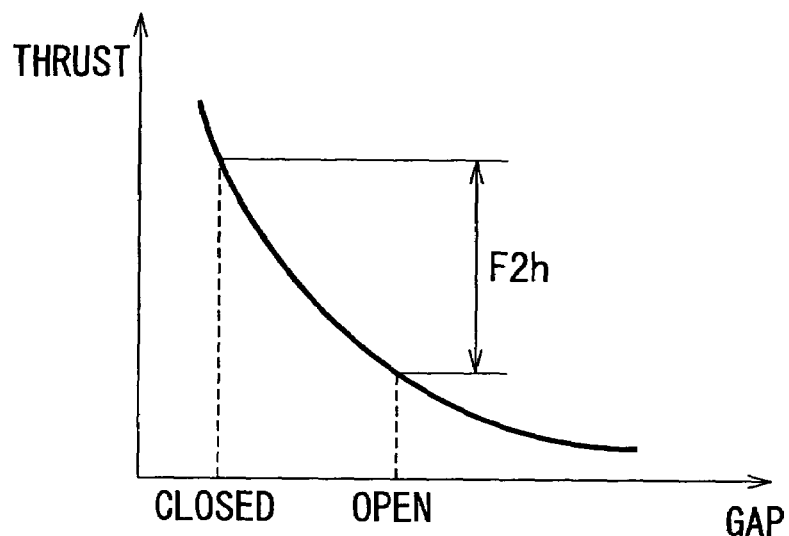
FIG. 7A is a thrust characteristic diagram when the gap portion between the movable member and channel coupling member is of an uninclined surface gap configuration.
Figure 7B:
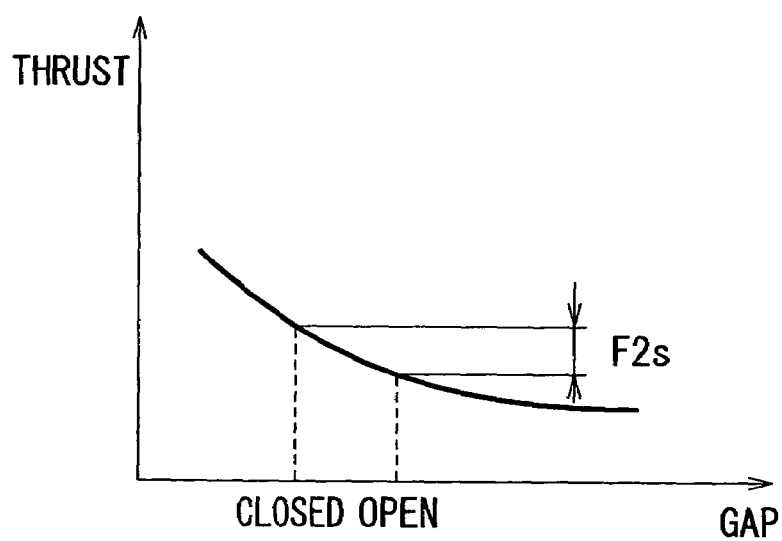
FIG. 7B is a thrust characteristic diagram when the gap portion between the movable member and channel coupling member is of an inclined surface gap configuration.

FIG. 7A is a characteristic diagram illustrating a thrust difference F2h between thrusts in the electromagnetic valve open state and in the electromagnetic valve closed state, in the electromagnetic valve 9 in the case where the opposing surfaces in the gap portion shown in FIG. 3 are uninclined surfaces (uninclined surface gap configuration). FIG. 7B is a characteristic diagram illustrating a thrust difference F2s between thrusts in the electromagnetic valve open state and in the electromagnetic valve closed state, in the electromagnetic valve 9 in the case where the opposing surfaces in the gap portion shown in FIG. 6 are inclined surfaces (inclined surface gap configuration). Further, FIG. 8 is a characteristic diagram illustrating available brake maintaining fluid pressures when the value of current to be passed through the solenoid coil 8 is changed, where the solid lines indicate pressures produced by solenoid thrust in a stroke state when the electromagnetic valve is closed and the broken lines indicate pressures produced by solenoid thrust in a stroke state when the electromagnetic valve is open.

As can be seen from FIGS. 7A and 7B, of the thrust differences F2h, F2s between thrusts in the electromagnetic valve open state and in the electromagnetic valve closed state, the thrust difference F2s in the inclined surface gap configuration is smaller than the thrust difference F2h in the uninclined surface gap configuration. Accordingly, forming the opposing surfaces in the gap portion into inclined surfaces 29a, 30a allows the relief pressure to be easily controlled by the electromagnetic valve 9.

Figure 8:
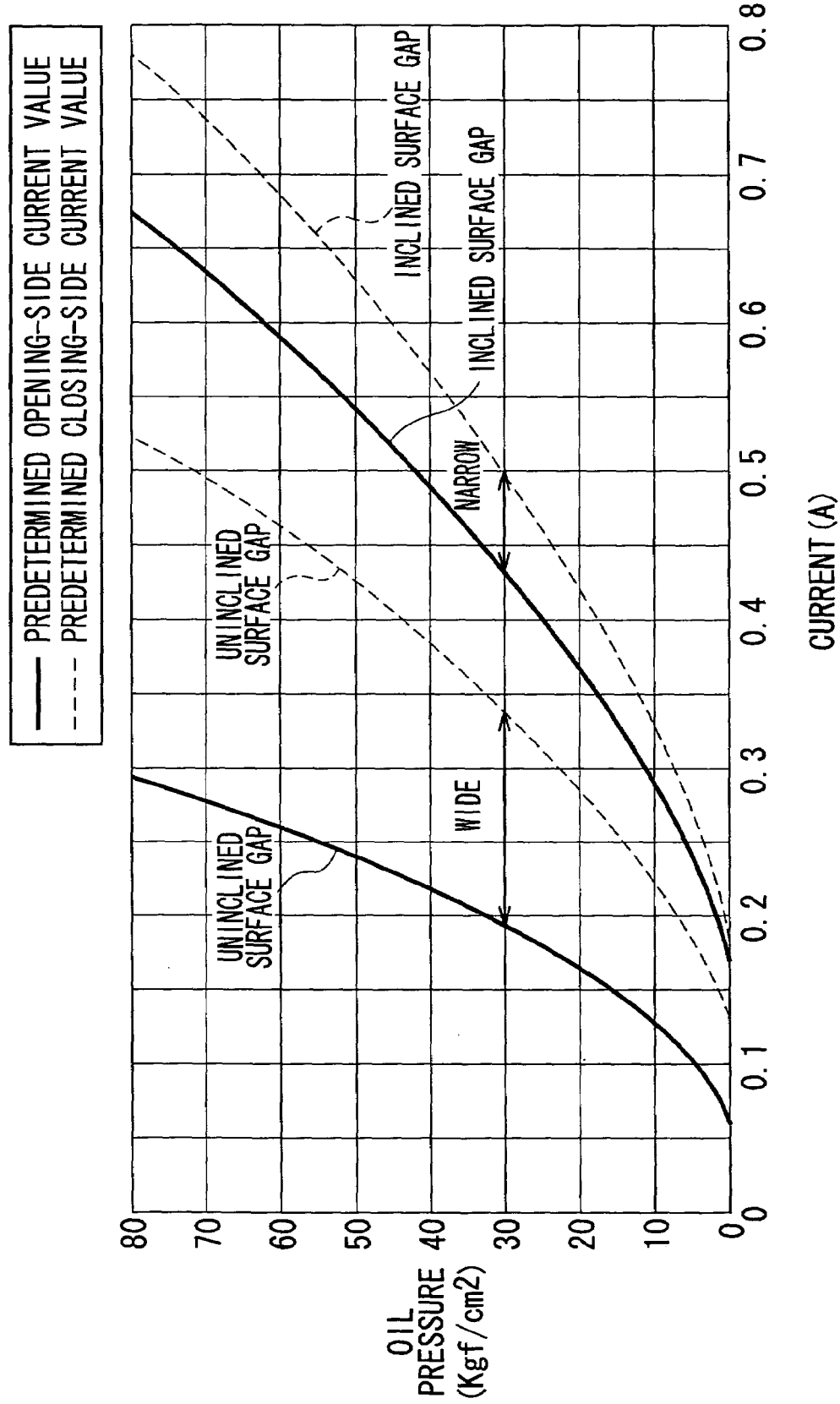
FIG. 8 is a characteristic diagram of oil pressure in an electromagnetic valve open state and in an electromagnetic valve closed state, each for the electromagnetic valve having an uninclined surface gap configuration and for the electromagnetic valve having an inclined surface gap configuration.

Moreover, as can be seen from FIG. 8, when observing the curves at the same value of brake fluid pressure (e.g., 30 Kgf/cm$^2$), a difference between the values of current to be passed through the solenoid coil 8 in the electromagnetic valve open state and in the electromagnetic valve closed state is large (wide) in the uninclined surface gap configuration, but a difference therebetween is small (narrow) in the inclined surface gap configuration. Accordingly, it is understood that the electromagnetic valve 9 having the opposing surfaces in the gap portion formed into the inclined surfaces 29a, 30a is easier to control than the electromagnetic valve 9 having the uninclined surface gap configuration.

Figure 9:
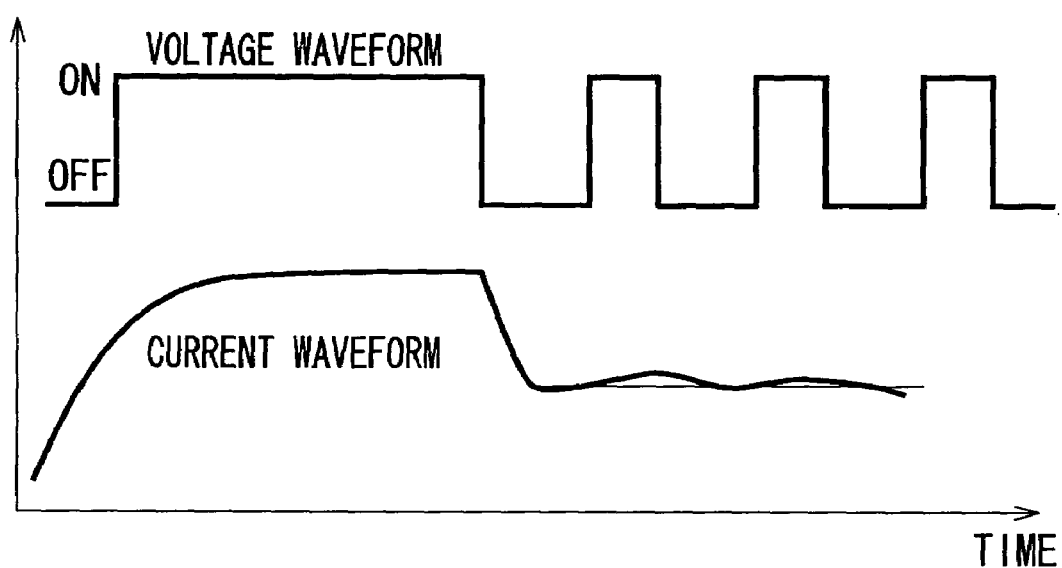
FIG. 9 is a diagram illustrating a current waveform and a voltage waveform varying with time when a constant value of current is passed through a solenoid coil.
Figure 10:
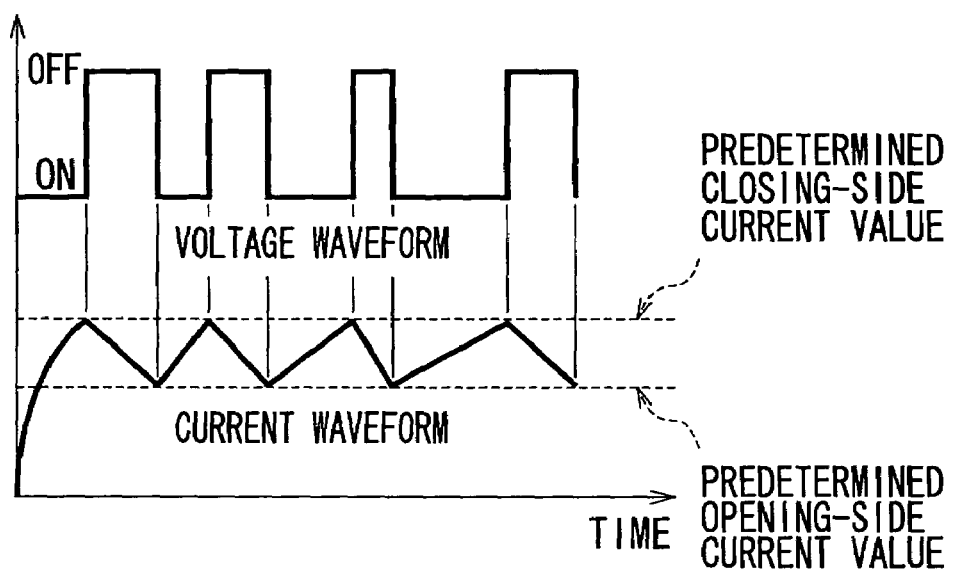
FIG. 10 is a diagram illustrating a current waveform and a voltage waveform varying with time when current is passed through the solenoid coil so that the value of the current is within a range between a predetermined opening-side current value and a predetermined closing-side current value.

Next, a concrete method of controlling the value of current will be explained in detail. The current to be passed through the solenoid coil 8 is not supplied to the solenoid coil 8 with a constant frequency as shown in FIG. 9, but is passed therethrough without a constant frequency in the following manner. Specifically, as shown in FIG. 10, the current is passed through the solenoid coil 8 with alternately changed current values within a range between a predetermined opening-side current value (required to switch the electromagnetic valve 9 from a closed state to an open state) and a predetermined closing-side current value (required to switch the electromagnetic valve 9 from an open state to a closed state), both determined for a target maintaining fluid pressure to maintain a predetermined braking force.

More specifically, the value of current to be passed through the solenoid coil 8 is controlled by the aforementioned electromagnetic valve control section 11 so that the current is supplied alternately at a predetermined opening-side current value and a predetermined closing-side current value corresponding to a target maintaining fluid pressure (brake fluid pressure at a degree that prevents a vehicle from creeping down on a hill) which can be read from the above-mentioned characteristic diagram of FIG. 8.

For instance, assuming that the target maintaining fluid pressure is 30 kgf/cm$^2$, in the case of the electromagnetic valve 9 of the inclined surface gap configuration, it can be read from FIG. 8 that the predetermined opening-side and closing-side current values required to achieve this target maintaining fluid pressure are about 0.43 A and 0.5 A, respectively. Then, in order that the current is supplied alternately at a predetermined opening-side current value of 0.43 A and a predetermined closing-side current value of 0.5 A, the current to be passed through the solenoid coil 8 is controlled while the predetermined opening-side and closing-side current values are monitored.

That is, when the value of current to be passed through the solenoid coil 8 reaches the predetermined opening-side current value, the current is passed through the solenoid coil 8, and when the value of the current reaches the predetermined closing-side current value, passing the current through the solenoid 8 is stopped. Thus, the current to be passed through the solenoid coil 8 is controlled while the current values corresponding to the target maintaining fluid pressure are referred so that the current is supplied alternately at the upper and lower threshold values (predetermined opening-side and closing-side current values). In this way, as indicated by a portion A of the solid line in FIG. 11, predetermined braking force corresponding to the target maintaining fluid pressure can be obtained.

When the value of current to be passed through the solenoid coil 8 is controlled as described above, it is possible to allow the electromagnetic valve 9 to perform a similar function to a relief valve and to freely change the relief pressure.

Accordingly, for a duration from a state in which a driver depresses the brake pedal 1 more strongly than needed on an uphill road, applying a high brake fluid pressure to the wheel cylinder 3 (portion B in FIG. 11), until a state in which the driver releases the brake pedal 1 and, instead, depresses the accelerator pedal, causing the vehicle to generate vehicle speed, it is possible that the brake fluid pressure is reduced from the brake fluid pressure higher than needed (portion C in FIG. 11) to the brake fluid pressure at a degree that prevents the vehicle from creeping down (portion A in FIG. 11), and this reduced brake fluid pressure is maintained.

Further, the brake fluid pressure is not controlled at a constant frequency, but is controlled using a target current value corresponding to target maintaining fluid pressure, resulting in frequency modulation. Accordingly, the occurrence of sound and vibration at a specific frequency can be significantly reduced.

Figure 11:
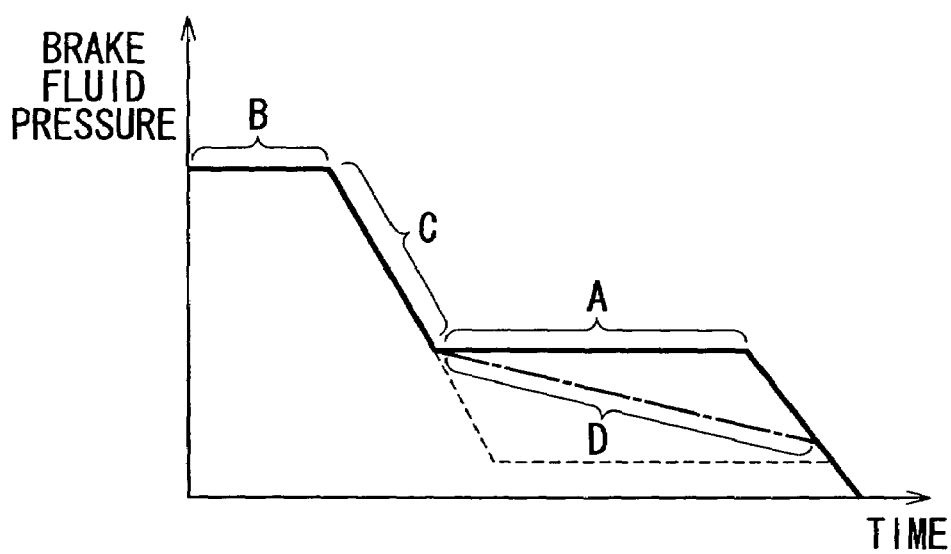
FIG. 11 is a characteristic diagram illustrating a brake fluid pressure varying with time when the value of current to be passed through the solenoid coil is constant and when the value of the current is within a range between a predetermined opening-side current value and a predetermined closing-side current value.

Moreover, the control corresponding to the portion A in FIG. 11 can be performed so that the brake fluid pressure is gradually reduced, as represented by a portion D indicated by the one-dot chain line in FIG. 11.

Figure 12:
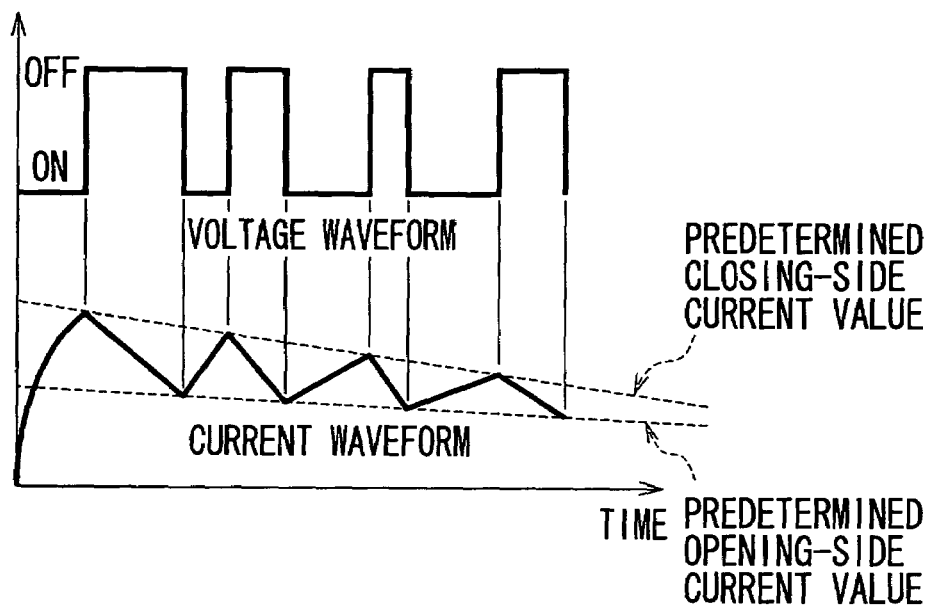
FIG. 12 is a diagram illustrating a current waveform and a voltage waveform varying with time when the brake fluid pressure within a wheel cylinder is slowly released little by little in a controlled manner.

For instance, as shown in FIG. 12, target current values corresponding to a target maintaining fluid pressure are reduced little by little over time, and current is passed through the solenoid coil 8 while predetermined opening-side and closing-side current values, equivalent to the target current values at the time of interest, are monitored. When the control is performed in this way, the brake fluid pressure inside the wheel cylinder 3 can be slowly released little by little.

By controlling the valve opening timing, the relief pressure and the pressure reduction rate as described above, a driver can smoothly start a vehicle even when starting the vehicle again in any conditions such as on a level road, a steep hill, and the like.

Figure 13:
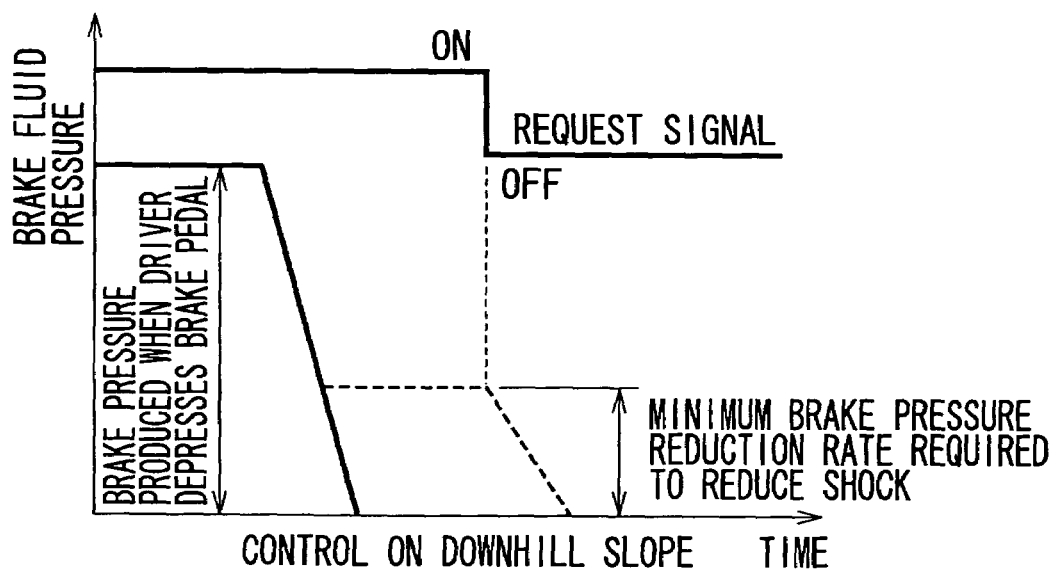
FIG. 13 is a characteristic diagram illustrating brake fluid pressure varying with time on a downhill road.

In addition, an application example according to this control method will be explained in detail. For instance, when a driver starts a vehicle again on a downhill slope, as shown in FIG. 13, the brake fluid pressure is reduced at a regular rate the moment the brake pedal 1 is released. In this case, the electromagnetic valve control section 11 may perform control of not passing current through the solenoid coil 8 or control of enabling a minimally required fluid pressure to be maintained as indicated by the dashed line. Thus, the pressure is abruptly reduced to a brake fluid pressure at a degree that cancels creep force, thereby maintaining the minimally required brake fluid pressure.

For instance, the brake fluid pressure is abruptly reduced from 40 atmospheres to approximately 10 atmospheres that allows creep force to be cancelled on a level road. This pressure reduction can suppress the drag upon releasing the maintaining pressure. Further, by gradually releasing the maintaining pressure from the release timing, it is possible to suppress a garage shock (a shock caused when an automatic transmission shift lever is changed from P range to D range) caused when a driver changes the pedals to depress from the brake pedal 1 to the accelerator pedal or when the engine is started in an idle stop state. Thus, a driver can smoothly start a vehicle.

Figure 14:
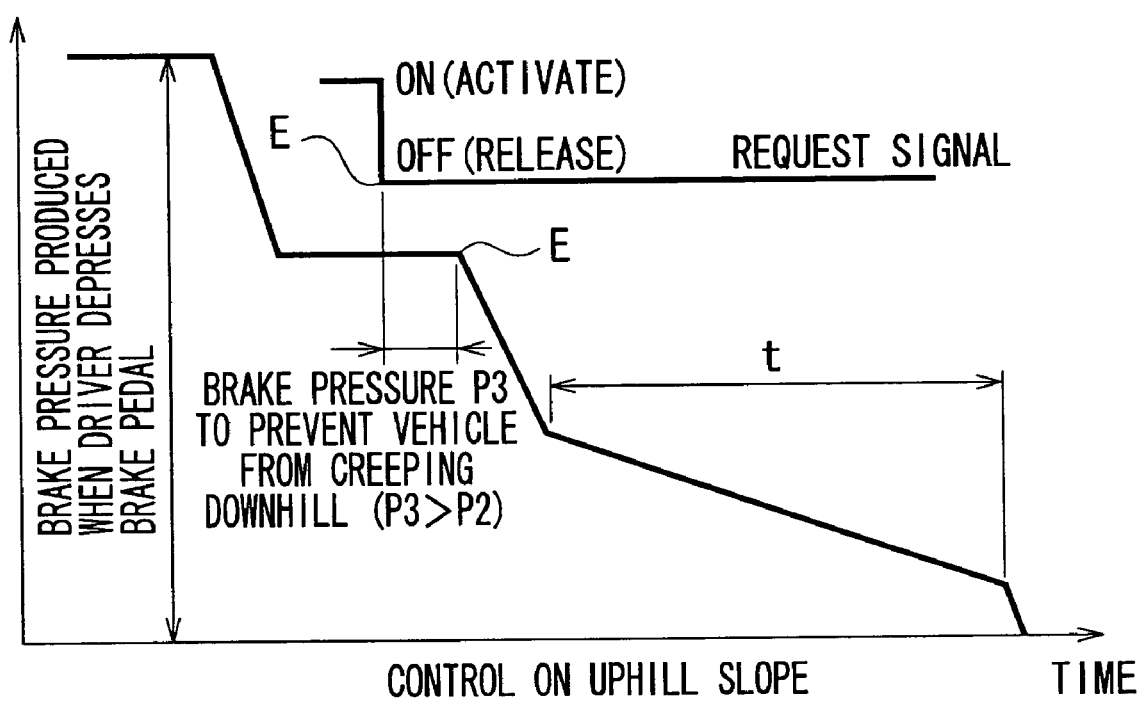
FIG. 14 is a characteristic diagram illustrating brake fluid pressure varying with time on an uphill road.

Next, as another application example, when a driver starts a vehicle on such an uphill slope that creep force alone is insufficient to prevent a vehicle from creeping down, the following operation is possible to prevent the vehicle from creeping down. As shown in FIG. 14, the maintaining fluid pressure is made slightly higher than that set on a level terrain. At the same time, a slight delay is provided after changing the pedals to be depressed from the brake pedal 1 to the accelerator pedal, and the target current values for the solenoid coil 8 is reduced over time as previously shown in FIG. 12, thus gradually reducing the brake fluid pressure that prevents the vehicle from creeping down even on a hill. In this case, to prevent the vehicle from creeping down until the accelerator pedal is depressed, the brake fluid pressure inside the wheel cylinder 3 is slowly reduced, thereby allowing a driver to start the vehicle while preventing the vehicle from creeping down.

As still another application example, controlling the electromagnetic valve 9 also allows the maintaining pressure for maintaining a brake fluid pressure to be variable in accordance with the degree of inclination of a hill, the state of a vehicle, or the like. To implement this control simply and suitably, the inclination of a vehicle when it is stopped is detected by the inclination sensor 12 for detecting the inclination of a hill. Based on the detected signal, a target maintaining fluid pressure is read from the memory 15, and the electromagnetic valve 9 is controlled using predetermined closing-side and opening-side current values corresponding to the read target maintaining fluid pressure. Further, to perform control in accordance with the state of a vehicle, a vehicle weight, varying depending on the presence of load such as freight and the presence of a cargo bed as in a case of a trailer, is detected by a sensor, and based on the detected signal, the electromagnetic valve 9 is similarly controlled.

Further, regarding the pressure reduction rate of the brake fluid pressure upon slow release, the state of a vehicle and a driver's intention (accelerator pedal operation, etc.) can be reflected on the pressure reduction rate. For instance, to reflect the driver's intention on the pressure reduction rate, a habit of a driver when depressing the accelerator pedal is learned, and the data indicative of this habit may be stored in the memory 15. Note that, in this case, a minimum time duration t (see FIG. 14) required to reduce the pressure is a time duration from restart of an engine to complete explosion thereof, in application to an idle stop vehicle.

In these application examples, predetermined opening-side and closing-side current values for each target maintaining fluid pressure at an arbitrary inclination angle are stored in the memory 15. For instance, when a vehicle is stopped on a level road, predetermined opening-side and closing-side current values corresponding to a target maintaining fluid pressure assigned to an inclination angle of the level road are read from the memory 15, and the electromagnetic valve control section 11 passes current through the solenoid coil 8 while monitoring the read predetermined opening-side and closing-side current values. Similarly, when a vehicle is stopped on a hill having an arbitrary inclination angle, predetermined opening-side and closing-side current values corresponding to a target maintaining fluid pressure assigned to the inclination angle in question are read from the memory 15.

Next, a learning function according to the present invention will be explained. In the present invention, when target current values varying depending on various states of a vehicle as described above are stored in the memory 15 in advance, performing the following learning operations allows a memory value to be suitably corrected with a learned value and then stored. The electromagnetic valve 9 is controlled depending on the state of a vehicle being stopped, by using the corrected predetermined opening-side and closing-side current values read from the memory 15. Therefore, a driver can perform smooth start operation under any situations without being conscious of the state of a road.

Figure 15A:
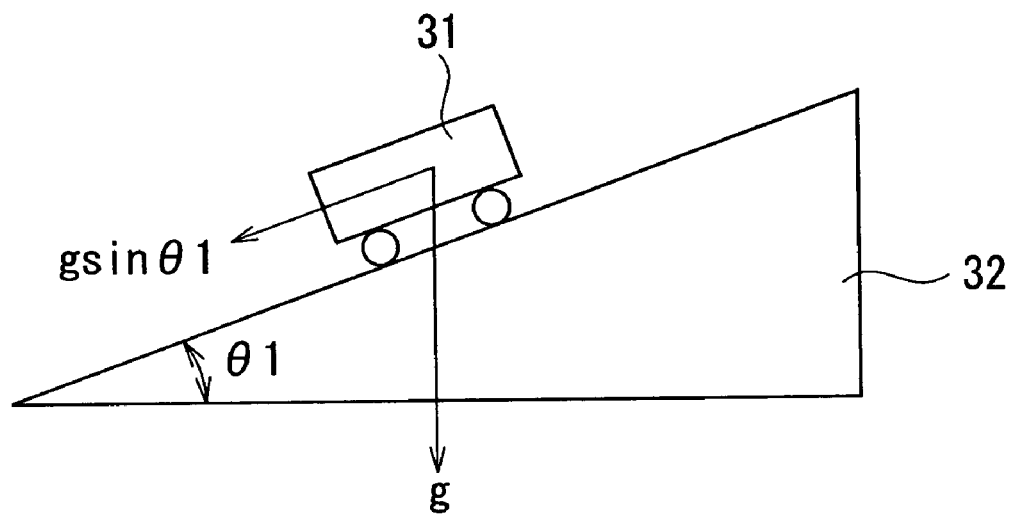
FIGS. 15A and 15B are diagrams illustrating a relation between a vehicle and an inclination angle of a hill to determine a learned value.
Figure 15B:
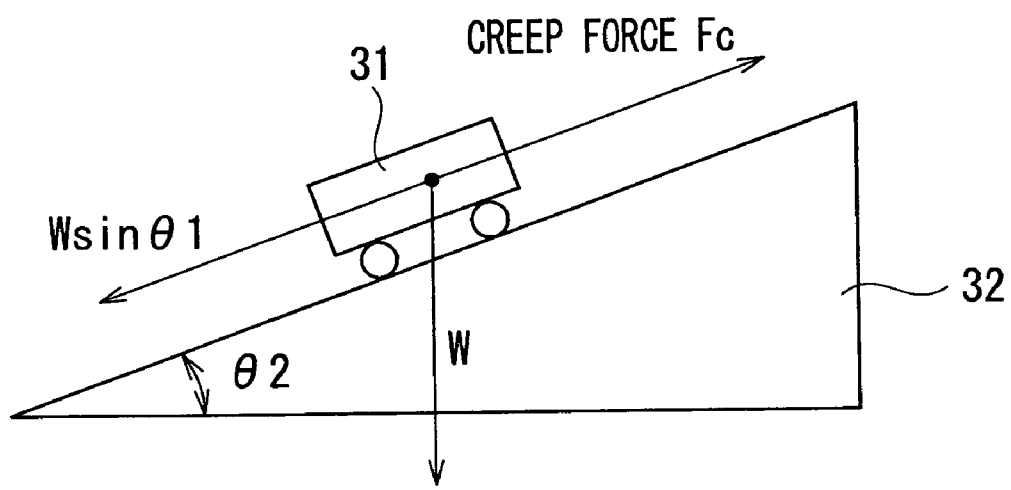

A method of learning and correcting a predetermined opening-side current value for a target maintaining fluid pressure for each inclination angle will be explained with reference to FIGS. 15A, 15B and 16. FIGS. 15A and 15B are diagrams, each illustrating a relationship between a vehicle 31 and an inclination angle of a hill 32 to determine a learned value G1. In FIGS. 15A and 15B, the symbols "g" and "w" represent the weight of the vehicle 31.

Figure 16:
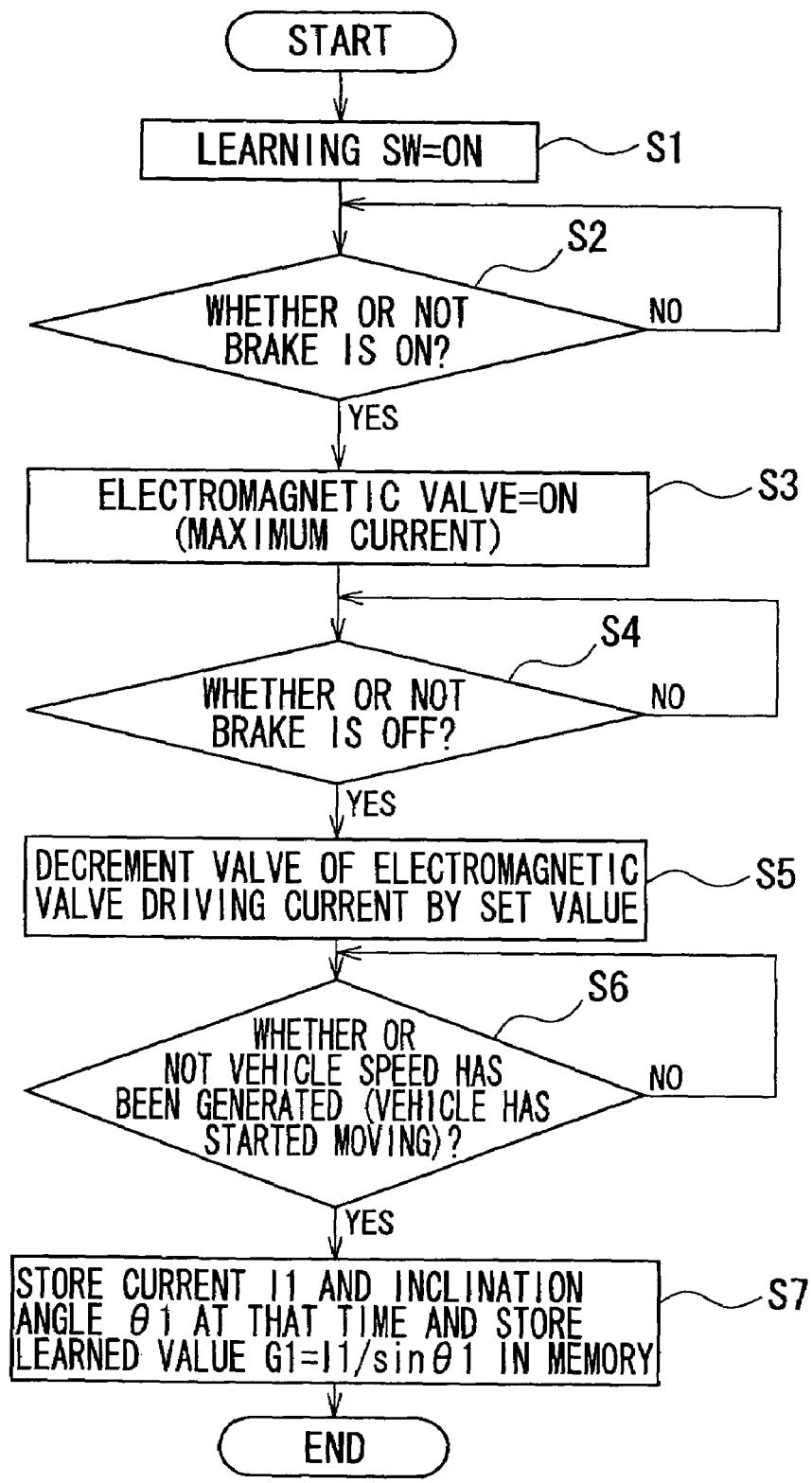
FIG. 16 is a flow chart illustrating how the predetermined opening-side and closing-side current values for each target maintaining fluid pressure are learned.

As shown in a flow chart of FIG. 16, first, in the processing of step S1, after assembly of a vehicle, a learning switch 14 is turned on (ON) when the vehicle is delivered from a factory. In the processing of the next step S2, the brake operation detecting section 10 detects whether or not the brake pedal 1 is depressed by a driver. When the brake operation detecting section 10 detects the depression of the brake pedal 1 (brake ON), the CPU 20 advances this learning processing to the next step S3. When the depression of the brake pedal 1 is not detected, the brake operation detecting section 10 repeats the processing of step S2 until the brake pedal 1 is depressed.

Next, when the brake pedal 1 is depressed in the processing of step S2, the electromagnetic valve control section 11 passes as much current (MAXIMUM current) as possible through the solenoid coil 8 in the processing of step S3. In the processing of the next step S4, the brake operation detecting section 10 detects whether or not the depression of the brake pedal 1 is released (brake OFF). When the depression of the brake pedal 1 is released in the processing of step S4, the CPU 20 advances this learning processing to the processing of step S5. When the brake operation detecting section 10 does not detect the release of the depression of the brake pedal 1, the processing of step S4 is repeated.

In the processing of step S5, the electromagnetic valve control section 11 decrements, by a set value, the value of electromagnetic valve driving current to be passed through the solenoid coil 8. Then, in the processing of the next step S6, when the vehicle speed sensor 13 detects a vehicle speed (detects that a vehicle speed has been generated, that is, a vehicle has started moving), or when the inclination sensor 12 detects that a vehicle has started moving based on a change in C, the CPU 20 advances this learning processing to the processing of step S7. When the fact that the vehicle has started moving is not detected, the processing of step S6 is repeated.

In the processing of step S7, a current I1 detected when the vehicle has started moving and an inclination angle $\theta 1$ read from the inclination sensor 12 are stored, and the CPU 20 calculates a learned correction coefficient G1 from the following equation (4) and stores it in the memory 15, thereby terminating this learning processing.

Thus, the learned correction coefficient G1 can be determined by the following equation (4).

$$G1 = I1/\sin \theta 1 \qquad \text{Equation (4)}$$

G1: learned correction coefficient
$\theta 1$: inclination angle upon learning
I1: current when a vehicle starts moving A current value In to be used in practice as a control value, corrected by learning, can be determined by the following equation (5), depending on an inclination angle n.

$$In = G1 \times \sin \theta n \qquad \text{Equation (5)}$$

G1: learned correction coefficient
$\theta n$: inclination angle
In: current corrected by learning Thus, variations in the maintaining pressure with respect to a supply current to the solenoid coil 8 are corrected (gain correction), and an optimal predetermined opening-side current value can be assured.

Next, similarly to the learning processing for the gain correction, a method of learning offset correction for an automatic transmission vehicle providing creep force will be explained with reference to FIG. 15B. In this case, learning processing is performed while an engine is running. An inclination angle is assumed to be $\theta 2$. The current value is gradually reduced similarly to FIG. 12, and a current value when a vehicle has started moving is stored as a learned correction coefficient G2 corresponding to a brake fluid pressure balancing creep force. Then, a difference $\Delta I (=I2-G2)$ between the coefficient G2 and a reference current value I2 corresponding to the inclination angle $\theta 2$, which is stored in a memory in advance, is stored in the memory as a correction value to be used in the subsequent steps. As a method of determining, for example, a correction control value, in a case of an arbitrary inclination angle $\theta m$, a learned correction value Gm corrected as in the following equation (6), is used as a control value.

$$Gm = Im - (I2 - G2) = Im - \Delta I \qquad \text{Equation (6)}$$

G2: learned value at an inclination angle $\theta 2$ of automatic transmission vehicle providing creep force
I2: previously stored reference current value for inclination angle $\theta 2$
Im: previously stored reference current value for inclination angle $\theta m$
Gm: control current value corrected by learning at an inclination angle $\theta m$
$\Delta I$: learned (correction) control current value (learned (correction) offset value)

Further, even when variations exist in product accuracy of the electromagnetic valve 9, zero point attachment to the inclination sensor 12, creep force of a vehicle, and braking force of a vehicle, the variations can be absorbed by using such learned values, and regular and stable control can be performed on all occasions. With regard to the order of those learning operations, the accuracy can be enhanced by implementing the offset learning first and then the gain learning.

(Brake Fluid Pressure Retaining Operation Using Learned Values)

Next, the brake fluid pressure retaining operation by the brake fluid pressure retaining unit 5 configured as described above, will be explained with reference to a flow chart shown in FIG. 17. The brake fluid pressure retaining processing starts when the brake operation detecting section 10 detects a fact that the release of the depression of the brake pedal 1 or the like is determined as the start of the brake retaining operation. First, after the inclination sensor 12 has detected an inclination angle of the surface of a road on which a vehicle is placed, the CPU 20 reads a target maintaining fluid pressure according to the detected inclination angle from the memory 15 (when the inclination sensor 12 is not provided, a preset target pressure is used). Then, the read target maintaining fluid pressure is set in the processing of step S9.

Subsequently, in the processing of step S10, the CPU 20 turns on (ON) the transistors TR1, TR2 for driving the electromagnetic valve 9. Next, in the processing of step 11, when there is no change in the target maintaining fluid pressure, the CPU 20 advances this brake fluid pressure retaining processing to the processing of step S12, and when there is a change, the CPU 20 advances the brake fluid pressure retaining processing to the processing of step S13. In the processing of step S13, the CPU 20 sets a new target maintaining fluid pressure.

In the processing of step S12, the CPU 20 detects whether or not the value of current to be passed through the solenoid coil 8 has reached a predetermined closing-side current value (expressed as "valve closing current" in the flow chart) for the target maintaining fluid pressure. When the current value has not reached the predetermined closing-side current value, the CPU 20 advances this brake fluid pressure retaining processing to the processing of step S15 and allows the transistors TR1, TR2 to retain their on-state. When the current value has reached the predetermined closing-side current value, the CPU 20 advances this brake fluid pressure retaining processing to the processing of step S14 and turns off (OFF) the driving of the transistors TR1, TR2.

Then, in the processing of the next step S16, the CPU 20 detects whether or not the value of current to be passed through the solenoid coil 8 has reached a predetermined opening-side current value (expressed as "valve opening current" in the flow chart) for the target maintaining fluid pressure. When the current value has not reached the predetermined opening-side current value, the CPU 20 advances this brake fluid pressure retaining processing to the processing of step S18 and turns off the driving of the transistors TR1, TR2. When the current value has reached the predetermined opening-side current value, the CPU 20 advances this brake fluid pressure retaining processing to step S17 and turns on the transistors TR1, TR2. Further, the CPU 20 continues to control current to be passed through the solenoid coil 8 while monitoring the predetermined closing-side and opening-side current values for the target maintaining fluid pressure.

As described above, according to the brake fluid pressure retaining unit 5 of the embodiment, predetermined opening-side current values and predetermined closing-side current values, which are target currents for target maintaining fluid pressures, are stored in advance in the memory 15, or learned predetermined opening-side current values and predetermined closing-side current values are stored in advance in the memory 15. By changing the target current values over time depending on the target maintaining fluid pressure varying with each passing time, a driver can smoothly start a vehicle again in a stop state under any road conditions.

The present invention is implemented in the mode as explained above and has the following effects.

According to the present invention, a simply-structured and low-cost brake fluid pressure retaining unit can be provided in which the relief pressure can be freely changed only with a low-cost electromagnetic valve, without using an expensive relief valve and orifice, and at the same time, pressure reduction at a slow release rate can be variable.

What is claimed is:

1. A brake fluid pressure retaining unit comprising:
   brake operation detecting means for detecting whether or not a brake of a vehicle providing creep force is operated;
   an electromagnetic valve having a solenoid coil and being provided midway in a brake fluid channel connecting a master cylinder and a wheel cylinder, the electromagnetic valve opening/closing the brake fluid channel in response to current being passed through the solenoid coil; and
   control means for detecting a release signal indicative of releasing brake operation detected by the brake operation detecting means, and for passing current through the solenoid coil while referring to predetermined current values, the predetermined current values corresponding to a target maintaining fluid pressure that maintains a predetermined braking force,
   wherein the predetermined current values correspond to an inclination of a surface, and
   wherein the control means passes current through the solenoid coil so that a value of the current is in a range between a predetermined opening-side current value and a predetermined closing-side current value determined in advance for each of the target maintaining fluid pressures, the predetermined opening-side current value being a current value required to switch the electromagnetic valve from a closed state to an open state, and the predetermined closing-side current value being a current value required to switch the electromagnetic valve from the open state to the closed state.

2. The brake fluid pressure retaining unit according to claim 1, further comprising:
   storage means, wherein
   the control means updates the predetermined opening-side current value and the predetermined closing-side current value for each of the target maintaining fluid pressures by learning, stores the updated predetermined opening-side current value and the updated predetermined closing-side current value in the storage means, and passes current through the solenoid coil based on the stored predetermined opening-side current value and the stored predetermined closing-side current value.

3. A brake fluid pressure retaining unit comprising:
   brake operation detecting means for detecting whether or not a brake of a vehicle providing creep force is operated;
   an electromagnetic valve having a solenoid coil and being provided midway in a brake fluid channel connecting a master cylinder and a wheel cylinder, the electromagnetic valve opening/closing the brake fluid channel in response to current being passed through the solenoid coil;
   control means for detecting a release signal indicative of releasing brake operation detected by the brake operation detecting means, and for passing current through the solenoid coil while referring to predetermined current values, the predetermined current values corresponding to a target maintaining fluid pressure that maintains a predetermined braking force; and a channel coupling member having a channel as a part of the brake fluid channel and a hole portion communicating with the channel, wherein the electromagnetic valve includes the solenoid coil, a movable member, a yoke, and a block member, the yoke houses the solenoid coil and the movable member, the movable member moves in relation to the solenoid coil, in response to on/off switching of current to be passed through the solenoid coil, a tip end of the movable member is inserted into the hole portion in the channel coupling member, the block member is fixed to the tip end of the movable member and opens/closes the channel in accordance with movement of the movable member, the movable member and the channel coupling member have inclination surfaces facing each other, and the block member closes the channel, in a state of the inclination surfaces being in contact with each others, wherein the inclination surface of the movable member and the inclination surface of the channel coupling member are disposed along a vertical plane.

4. The brake pressure retaining unit according to claim 3, wherein the control means passes current through the solenoid coil so that a value of the current is in a range between a predetermined opening-side current value and a predetermined closing-side current value determined in advance for each of the target maintaining fluid pressures, the predetermined opening-side current value being a current value required to switch the electromagnetic valve from a closed state to an open state, and the predetermined closing-side current value being a current value required to switch the electromagnetic valve from the open state to the closed state.

5. The brake fluid pressure retaining unit according to claim 4, further comprising:

storage means, wherein the control means updates the predetermined opening-side current value and the predetermined closing-side current value for each of the target maintaining fluid pressures by learning, stores the updated predetermined opening-side current value and the updated predetermined closing-side current value in the storage means, and passes current through the solenoid coil based on the stored predetermined opening-side current value and the stored predetermined closing-side current value.

6. A brake fluid pressure retaining unit comprising:

brake operation detecting means for detecting whether or not a brake of a vehicle providing creep force is operated;

an electromagnetic valve having a solenoid coil and being provided midway in a brake fluid channel connecting a master cylinder and a wheel cylinder, the electromagnetic valve opening/closing the brake fluid channel in response to current being passed through the solenoid coil; and wherein control means for detecting a release signal indicative of releasing brake operation detected by the brake operation detecting means, and for passing current through the solenoid coil while referring to predetermined current values, the predetermined current values corresponding to a target maintaining fluid pressure that maintains a predetermined braking force, wherein the control means passes current through the solenoid coil so that a value of the current is in a range between a predetermined opening-side current value and a predetermined closing-side current value determined in advance for each of the target maintaining fluid pressures, the predetermined opening-side current value being a current value required to switch the electromagnetic valve from a closed state to an open state, and the predetermined closing-side current value being a current value required to switch the electromagnetic valve from the open state to the closed state.

7. The brake fluid pressure retaining unit according to claim 6, further comprising storage means, wherein the control means updates the predetermined opening-side current value and the predetermined closing-side current value for each of the target maintaining fluid pressures by learning, stores the updated predetermined opening-side current value and the updated predetermined closing-side current value in the storage means, and passes current through the solenoid coil based on the stored predetermined opening-side current value and the stored predetermined closing-side current value.

8. The brake fluid pressure retaining unit according to claim 7, further comprising a channel coupling member having a channel as a part of the brake fluid channel and a hole portion communicating with the channel, wherein the electromagnetic valve includes the solenoid coil, a movable member, a yoke, and a block member, the yoke houses the solenoid coil and the movable member, the movable member moves in relation to the solenoid coil, in response to on/off switching of current to be passed through the solenoid coil, a tip end of the movable member is inserted into the hole portion in the channel coupling member, the block member is fixed to the tip end of the movable member and opens/closes the channel in accordance with movement of the movable member, the movable member and the channel coupling member have inclination surfaces facing each other, and the block member closes the channel, in a state of the inclination surfaces being in contact with each other.

9. The brake fluid pressure retaining unit according to claim 6, further comprising a channel coupling member having a channel as a part of the brake fluid channel and a hole portion communicating with the channel, wherein the electromagnetic valve includes the solenoid coil, a movable member, a yoke, and a block member, the yoke houses the solenoid coil and the movable member, the movable member moves in relation to the solenoid coil, in response to on/off switching of current to be passed through the solenoid coil, a tip end of the movable member is inserted into the hole portion in the channel coupling member, the block member is fixed to the tip end of the movable member and opens/closes the channel in accordance with movement of the movable member, the movable member and the channel coupling member have inclination surfaces facing each other, and the block member closes the channel, in a state of the inclination surfaces being in contact with each other.

* * * * *